United States Patent [19]
Okamoto et al.

[11] 3,774,514
[45] Nov. 27, 1973

[54] ELECTRIC CONTROL CIRCUITRY FOR CAMERA CURTAIN SHUTTERS

[75] Inventors: Akio Okamoto, Ikuno-ku, Osaki-shi; Toshiaki Matsumoto, Amagasaki-shi, Hyogo-ken, both of Japan

[73] Assignee: Minolta Camera Kabushiki Kaisha, Osaka, Japan

[22] Filed: Jan. 17, 1973

[21] Appl. No.: 324,333

[52] U.S. Cl. ............ 95/31 EL, 95/31 AC, 95/53 E, 95/57
[51] Int. Cl. ............................................. G03b 9/32
[58] Field of Search ............... 95/31 AC, 31 FL, 95/31 EL, 53 E, 57

[56] References Cited
UNITED STATES PATENTS
3,688,674  9/1972  Kuramoto et al. ............... 95/53 E FOREIGN PATENTS OR APPLICATIONS
1,160,299  12/1963  Germany .......................... 95/31 EL Primary Examiner—Robert P. Greiner
Attorney—Watson, Cole, Grindle & Watson

[57] ABSTRACT

A circuit for actuating shutter to control an exposure in a camera includes structure for detecting incorrect movement of the shutter as an indication that the battery voltage is insufficient for blocking release of the trailing member of the shutter to properly control the exposure. The operation of the camera is blocked when the movement of the shutter is incorrect and the normal operation of the camera is restored upon replacement of the defective battery.

4 Claims, 8 Drawing Figures

ELECTRIC CONTROL CIRCUITRY FOR CAMERA CURTAIN SHUTTERS

BACKGROUND OF THE INVENTION:

FIELD OF THE INVENTION

This invention relates to electric control circuitry for photographic cameras of the type wherein the measurement of exposure time commences upon release of the leading member and an electromagnet is energized for retaining the trailing member in a cocked position in response to shutter releasing operation for controlling the exposure.

It is well known in the art that the electrically controlled shutters of the type mentioned above are advantageous in that they are capable of correctly controlling the exposure either at a high shutter speed with a bright subject field or at a low shutter speed with a dark subject field.

However, when the battery which supplies power to the electric control circuit degenerates, the electromagnet loses its attractive force and becomes incapable of retaining the trailing member in the cocked position. The trailing member therefore is allowed to be released at the same time with the release of the leading member, with the result that the exposure is not effected even if the shutter is released. The operator is not aware of this exposure failure until the unexposed film or frame has been developed.

If such exposure failure is repeated, the film is transported for each photographing operation without being exposed. In order to remove this defect, it is necessary to provide a warning to the operator whenever a material voltage drop occurs to the battery for preventing repeated transportation of the unexposed film.

In U. S. patent application Ser. No. 259,194, filed June 2, 1972, an improved camera construction is disclosed wherein the film transportation and shutter cocking, which are associated with the winding operation, are locked when the electromagnet, which is energized by the output of the electric control circuit, becomes incapable of retaining the trailing member in the cocked position due to a drop in the power source battery voltage, by a detection member. It is therefore unnecessary to check the voltage level of the battery before each photographing operation or to provide a metering device for checking the voltage of the battery. If the voltage drops below a predetermined level the detection member causes the camera to be inoperative to provide a warning to the operator while preparing for the subsequent photographing operation to prevent repetition of exposure failure due to undervoltage of the battery. However, in such a case, it is desirable to return the camera to the normal operative state simply by replacing the exhausted battery with a new one, without requiring complicated restoring procedures.

THE OBJECTS OF THE INVENTION:

It is an object of the present invention to provide an electric control circuit for a camera shutter, wherein when the trailing member fails to be retained in the cocked position for controlling the exposure by an electromagnet because of low battery voltage that failure is detected by a detecting member for placing the camera in an inoperative condition initiated by the shutter releasing operation to give a warning to the operator. The camera is returned to the normal operative condition as soon as the exhausted battery is replaced with a new one.

It is another object of the present invention to provide an electric control circuit for a camera shutter, wherein when the trailing member fails, the winding operation is blocked after release of the shutter for preventing transportation of the film and shutter cocking.

It is still another object of the present invention to provide an electric control circuit for a camera shutter having a locking member for blocking the winding operation upon completion of film transportation and shutter cocking, wherein when the battery has a voltage equivalent to or over a predetermined level and the output of the electric control circuit is capable of normal operation a detecting member urges the locking member to remove the blocking action upon completion of exposure in accordance with the shutter releasing operation to allow further framewise film transportation and shutter cocking.

SUMMARY OF THE INVENTION

The present invention provides an electric control circuit for a camera shutter which is actuated by the releasing operation of the camera and adapted to commence measurement of time upon release of the leading member. An electromagnet is energized by the output of the electric control circuit for retaining the trailing member in a cocked position over a preset period of time for controlling the exposure. A detecting member sets the camera in an inoperative condition when the electromagnet fails to retain the trailing member in the cocked position due to a voltage drop in the battery to give a warning to the operator prior to the subsequent photographing operation. The camera is returned to the normal operative condition simply by replacement of the battery.

In order to place the camera temporarily in an inoperative condition to warn the operator, it is possible to block either a wind-up operating member which is associated with the framewise film transportation and shutter cocking mechanisms, the return of a movable mirror from a picture taking position to a viewing position, the return of the release button, the releasing operation of the release button in a subsequent photographing operation, or the focusing operation or lens diaphragm adjusting operation. If either one of these operations is blocked, the operator is restrained from performing another photographing operation and is warned that the camera is inoperative due to an insufficient voltage output of the battery.

DETAILED DESCRIPTION OF THE INVENTION

Figure 1:
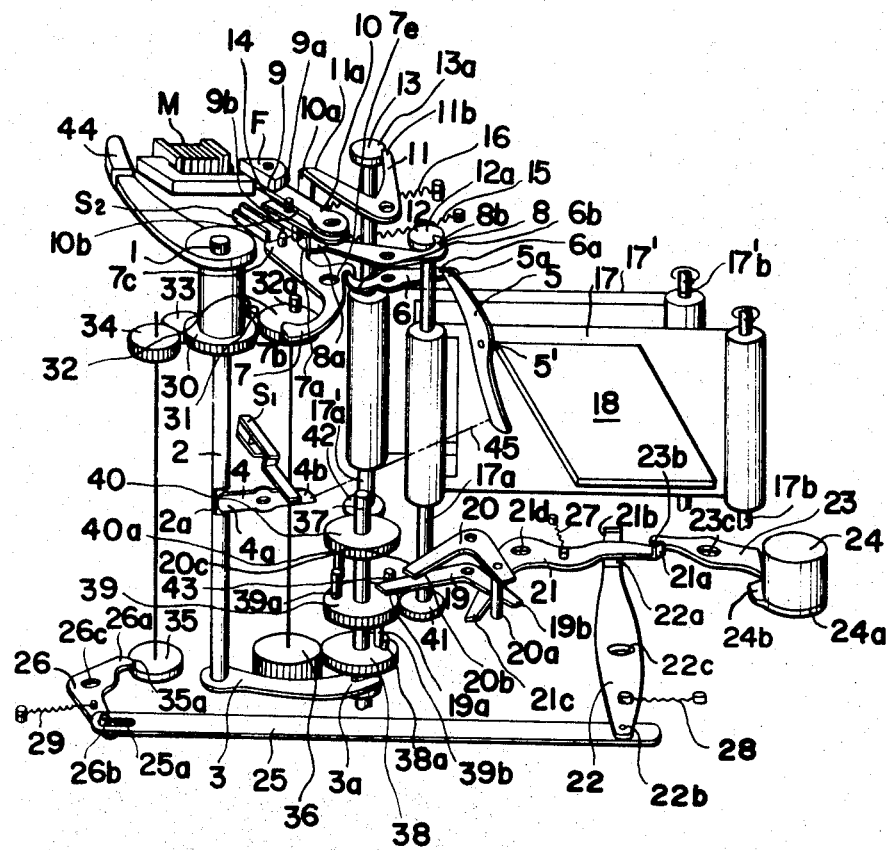
FIG. 1 is a perspective view of an embodiment according to the present invention, showing the construction of essential components thereof in a position where the shutter is cocked.

Referring to FIG. 1, a release button 1 is loosely mounted on a shaft of winding lever 44. The lower end of the release button is securely connected by way of connecting shaft 2 to plate member 3 which has a fork or bifurcated portion at the free end thereof. The fork portion 3a of plate member 3 is held in engagement with clutch gear 38 which is loosely mounted on shaft 37 for moving clutch gear 38 up and down with respect to shaft 37 in relation with upward and downward movement of plate member 3.

Connecting shaft 2 is formed with notched portion 2a which is engaged with one arm of lever 4. Lever 4 is rotatably supported on the camera body by means of a shaft fitted into bore 4c and provided with arm 4b which is held in engagement with a movable contact which is biased in a direction to open switch S1 of the electric control circuit of FIG. 2. Switch S1 is closed by downward movement of connecting shaft 2. Arm 4b of lever 4 is mechanically connected to mirror lever 5 by linking mechanism 45 as shown in FIG. 1, so that the downward movement of connecting shaft 2 imparts counterclockwise rotation to lever 4 for rotating mirror lever 5 likewise in the counterclockwise direction to rotatingly shift mirror 18 from the viewing position to the picture taking position.

End portion 5a of mirror lever 5 comes into engagement with one end of intermediate lever 6 at the final position of its counterclockwise rotation for rotating intermediate lever 6 in the counterclockwise direction. The other end of intermediate lever 6 is formed with claw 6a which is engageable with hooked portion 7d of switch lever 7 which is rotatably supported on the camera body by means of a shaft fitted into shaft bore 7e thereof. Switch lever 7 is biased to rotate in the clockwise direction by spring 15, and is provided with bent portion 7a which is engageable with one end 8a of leading curtain stopping lever 8 and pin member 9b of overcharge lever 9 during the clockwise rotaton of switch lever 7. Insulating pin member 7c is urged to open trigger switch S2 for shortcircuiting a timing capacitor in the electric control circuit shown in FIG. 2. Arm 7b is engageable with pin member 32a of gear 32 which is securely mounted on a film transportation sprocket shaft which will be described in greater detail hereinafter, in such a manner that when engagement between arm 7b and pin member 32a is established by rotation of gear 32, switch lever 7 is rotated in the counterclockwise direction against the tension of spring 15.

Wind-up gear 30 which is mounted coaxially and intergrally with wind-up lever 44 meshes through idle gear 31 with gear 32 which is securely mounted on the sprocket shaft mentioned hereinbefore. Wind-up gear 30 meshes through idle gear 31 and gear 33 with gear 34 which is securely mounted on a film rewinding shaft.

The film rewinding shaft securely supports thereon cam plate 35 which has notched portion 35a.

The above-mentioned sprocket shaft securely supports thereon gear 36 in coaxial relationship with gear 32. Gear 36 is constantly held in engagement with clutch gear 38 even if clutch gear 38 is moved up and down with respect to shaft 37.

Pin member 38a projects from clutch gear 38 and is engageable, in a raised position with respect to shaft 37 of clutch gear 38 with connecting pin member 39b of leading curtain winding gear 39 which is loosely fitted on and restricted in its axial movement by shaft 37. The engagement between pin member 38a and connecting pin member 39b is broken when clutch gear 38 is in a lowered position with respect to shaft 37 to comprise a clutch means.

Leading curtain winding gear 39 has connecting pin member 39a which is engageable with connecting pin member 40a which is fixed on trailing curtain wind-up gear 40.

Leading and trailing curtain wind-up gears 39 and 40 mesh with leading curtain gear 41 which is securely mounted on leading curtain winding shaft 17a for winding up leading curtain 17, and with trailing curtain gear 42 which is likewise securely mounted on trailing curtain winding shaft 17a' for winding up trailing curtain 17', respectively. Leading curtain wind-up shaft 17a has secured thereto leading curtain stopping plate member 12 while trailing curtain wind-up shaft 17a' has secured thereto leading curtain stopping plate member 13. Leading curtain stopping plate member 12 is formed with notch 12a which is engageable with claw 8b of leading curtain stopping lever 8. Trailing curtain stopping plate member 13 has notch 13a which is engageable with claw 11b on one arm of trailing curtain stopping lever 11.

Overcharge lever 9 is rotatably mounted in coaxial relationship with switch lever 7 and is urged to rotate in the clockwise direction by spring member 16 and has projected therefrom actuating pin member 9a. Trailing curtain releasing lever 10 is rotatably mounted in coaxial relationship with switch lever 7 and overcharge lever 9 is biased to abut with actuating pin member 9a by the tension of spring member 14. Trailing curtain releasing lever 10 is provided with armature F and bent strip member 10a in a position facing an electromagnet which is energized by the output of the electric control circuit shown in FIG. 2. Bent strip member 10a is held in engagement with the other end portion 11a of trailing curtain stopping lever 11.

Leading and trailing curtains 17 and 17', which are wound at the respective ends thereof around leading curtain wind-up shaft 17a and trailing curtain wind-up shaft 17a' are wound at their other respective ends around rewinding shafts 17b and 17b' which are cocked to rotate in the rewinding direction.

Figure 2:
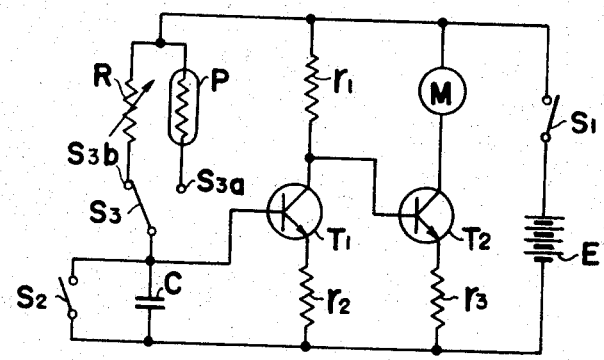
FIG. 2 is a diagram of an electric control circuit for the same embodiment.
Figure 3:
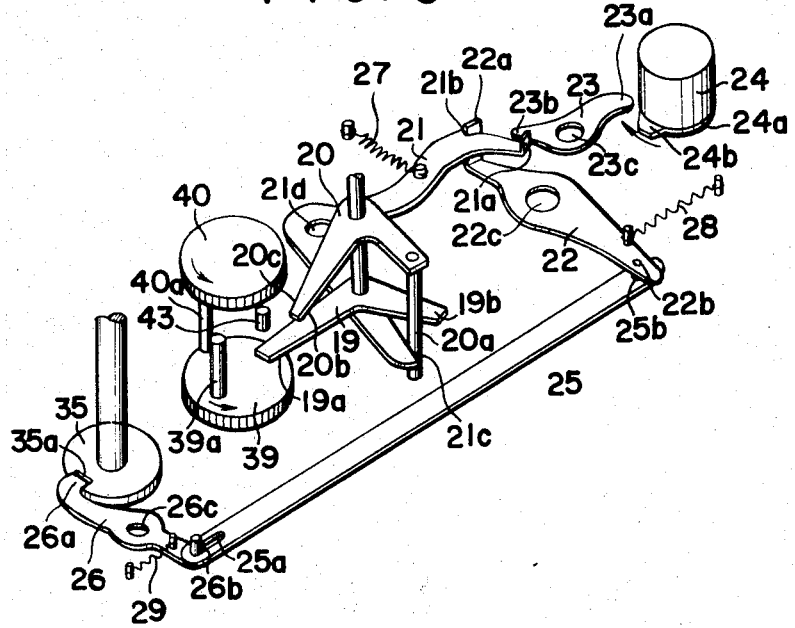
FIG. 3 is a perspective view showing the essential components for blocking and relieving the winding operation of the camera for placing the camera in an inoperative condition.

Referring to the electric control circuit shown in FIG. 2, power switch S1 is connected in series to battery E. One terminal each of photoelectric element P and variable resistor R are connected in parallel to power switch S1 and the other respective terminal of photoelectric element P and variable resistor R are connected to capacitor C through change-over switch S3. The capacitor C is connected in parallel to trigger switch S2 to form a timing circuit. The voltage across capacitor C is applied to the base and emitter of transistor T1 of the switching circuit. The collector of transistor T1 is connected to the base of transistor T2 and the collector of transistor T2 is connected to electromagnet M. r1, r2 and r3 designate fixed resistors of the switching circuit.

The above described mechanisms and circuitry operate essentially the same as conventional single lens reflex camera mechanisms having an electric control circuit for controlling the curtain shutter. More particularly, when wind-up lever 44 is rotated in the counterclockwise direction, the film is transported frame-by-frame by sprocket gear 32 to wind the film on the winding shaft by means of film winding gear 34. Simultaneously, clutch gear 38 is rotated clockwise by gear 36 to connect pin member 28a to connection pin member 39b for rotating leading curtain wind-up gear 39 in the same direction. This brings pin members 39a and 40a into engagement with each other and rotates trailing curtain wind-up gear 40 in the same clockwise direction for winding up leading and trailing curtains 17 and 17' around their respective wind-up shafts 17 and 17a' to cock the shutter. Also, leading and trailing curtain stopping plate members 12 and 13 are rotated in the counterclockwise direction.

Further, pin member 32a is engaged with arm 7b to rotate switch lever 7 in the counterclockwise direction against the tension of spring member 15, thereby allowing hooked portion 7d to engage with claw 6a and insulating pin member 7c to close trigger switch S2. Bent strip member 7a allows the leading curtain stopping lever to rotate in the counterclockwise direction to bring claw 8b into engagement with notched portion 12a, while bent strip member 7a engages with actuating pin member 9b to rotate overcharge lever 9 in the counterclockwise direction against the tension of spring 16. Trailing curtain releasing lever 10 is thus urged to rotate in the same direction under the tension of spring 14. As a result, armature F of releasing lever 10 is pressed against electromagnet M and bent strip member 10a allows trailing curtain stopping lever 10 to rotate in the counterclockwise direction to bring claw 11b into engagement with notched portion 13a of trailing curtain stopping plate member 13 to retain the shutter in the cocked position, thus completing the winding operation.

Therefore, if the voltage of battery E is above a predetermined level and if release button 1 is pressed down to close power switch S1, the engagement between pin member 38a and connecting pin member 39b is broken by the downward movement of clutch gear 38. Simultaneously, mirror 18 is shifted to the picture taking position by the rotation of mirror lever 5 so that intermediate lever 6 is rotated in the counterclockwise direction to disengage claw 6b from hooked portion 7d. Switch lever 7 is rotated in the clockwise direction by the tension of spring 15 for opening trigger switch S2 to energize electromagnet M to attract armature F securely thereto.

With the rotation of switch lever 7, bent strip member 7a is brought into engagement with arm 8a of leading curtain stopping lever 8, pushing lever 8 to disengage claw 8a from notched portion 12a. Leading curtain wind-up shaft 17 is therefore freed and the leading curtain is unwound from rewinding shaft 17b to start the exposure and the connection between pin members 39a and 40a is broken. However, trailing curtain wind-up shaft 17a' is still blocked by trailing curtain stopping plate member 13 and trailing curtain stopping lever 11.

At the correct exposure time controlled by the electric control circuit, electromagnet M is de-energized, so that releasing lever 10 is rotated in the clockwise direction by spring 16 to impart similar clockwise rotational movement to trailing curtain stopping lever 11 for disengaging claw 11b from notch 13a. Trailing curtain wind-up shaft 17a' is thus freed and trailing curtain 17' is driven by rewinding shaft 17b' to terminate the exposure.

If, in the above operation, the voltage of battery E is below a predetermined level, electromagnet M fails to retain releasing lever 10 by its attractive force acting on armature F, against the tension of spring 16. When the engagement between pin members 39a and 40a is broken by the releasing operation, leading and trailing curtains 17 and 17' are driven almost simultaneously without effecting an exposure.

However, according to the invention, there is provided, as a detecting member, first operating lever 19 which is rotatably mounted on the camera body and provided with arm 19a which is disposed within the rotational movement of connecting pin member 39a when the leading curtain is unlocked and leading curtain wind-up gear 39 is allowed to rotate. Second operating lever 20 is rotatably mounted above and in coaxial relationship with first operating lever 19. Second operating lever 20 has projected from one arm thereof pin member 20a in such a position that pin member 20a comes into engagement with arm 19b during the clockwise rotation of first operating lever 19. As mentioned hereinbefore, when first lever 19 is rotated, arm 20b is urged to intrude into the rotational path of connecting pin member 40 and arm 21c of blocking lever 21 is disposed in a position engageable with pin member 20a upon the clockwise roation thereof. Blocking lever 21 is rotatably mounted on the camera body by a shaft inserted into shaft bore 21d and is biased to rotate in the counterclockwise direction by spring member 27. Blocking lever 21 is provided on the other arm 21b thereof with notched portion 21b and at the fore end thereof with bent strip member 21a.

Releasing lever 22 is rotatably mounted on the camera body by means of a suitable shaft and urged to rotate in the counterclockwise direction by means of spring member 28. Releasing lever 22 has mounted on the other arm thereof pin member 22b which is fitted into a bore provided at one end of connecting rod member 25. Connecting rod member 25 has elongated slot 25a which receives pin member 26b mounted at one arm of lock lever 26 which is rotatably mounted on the camera body and biased to rotate in the clockwise direction by spring 29. Lock lever 26 is provided at the other arm thereof with claw 26a which is engageable with notch 35a of cam plate 35 which is securely mounted on the film rewinding shaft.

Pin member 43 restricts the clockwise rotational movement of first operating lever 19, and pin member 43 is securely mounted to the camera body.

Furthermore, third operating lever 23 is rotatably mounted on the camera body in such a manner that one arm 23b of third operating lever 23 is disposed in a position engageable with bent strip member 21a of blocking lever 21. The other arm 23a of third operating lever 23 is located within the path of lid member 24a which is in threaded engagement with battery chamber 24.

Figure 4:
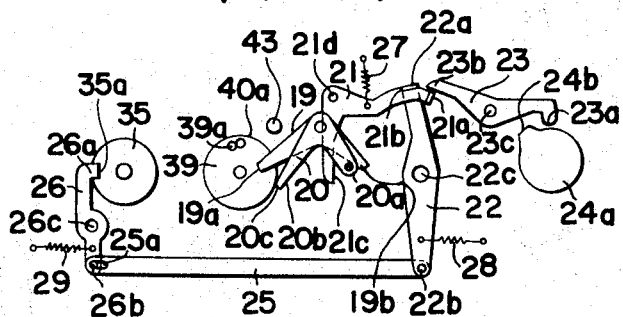
FIG. 4 is a partial plan view showing the shutter mechanism of FIG. 3 in a cocked position.

Thus, upon completion of the frame-by-frame wind-up of the film and shutter cocking by wind-up lever 44, claw 26a of lock lever 26 is brought into engagement with notched portion 35a of cam plate 35 for blocking any further wind-up operation as seen from FIG. 4.

Figure 6:
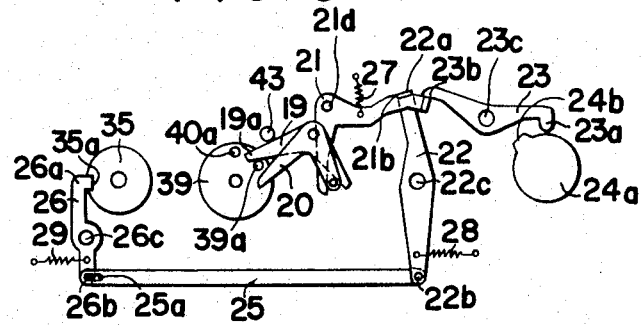
FIG. 6 is a partial plan view showing the shutter mechanism during exposure when the voltage of the battery exceeds a predetermined level.

In association with the releasing operation of release button 1, leading curtain wind-up shaft 17a is unlocked to allow rotation of connecting pin member 39a. If at this time the voltage of the power source or battery is higher than a predetermined level, electromagnet M attracts the armature of trailing curtain releasing lever 10 to block the rotation thereof, so that connecting pin members 39a and 40a are disengaged from each other and only pin member 39a is rotated in the counterclockwise direction. Connecting pin member 39a is brought into engagement with arm 19a of first operating lever 19 to urge it to rotate clockwise into a position for engagement with stopper 43. As a result, arm 20b of second operating lever 20 is brought into the rotational path of connecting pin member 40, as shown in FIG. 6.

Figure 7:
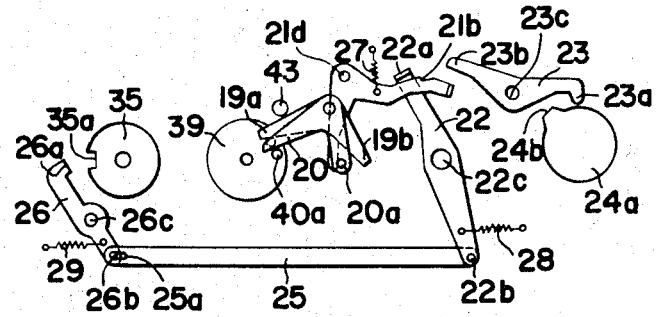
FIG. 7 is a partial plan view showing the shutter mechanism at the end of the exposure when the voltage of the battery exceeds a predetermined level.

At a suitable time controlled by the electric control circuit, connecting pin member 40a is also rotated in the counterclockwise direction and second operating lever 20 is allowed to rotate in the clockwise direction, so that blocking lever 21 is rotated in the clockwise direction, disengaging notch 21b from bent strip member 22a. As a result, releasing lever 22 is rotated in the clockwise direction by spring 28 and connecting rod member 25 is moved to the right, slot 25a drawing pin member 26 in the rightward direction for rotating lock lever 26 in the counterclockwise direction against the tension of spring 29. By this counterclockwise rotation of lock lever 26, claw 26a is retracted from notch 35a to unlock cam plate 35 as shown in FIG. 7.

It will be understood that film transportation and shutter cocking for subsequent photographing operations are effected at one time simply by the winding operation of lever 44. Thereby first and second operating levers 19 and 20 are rotated in the counterclockwise direction by connecting pin members 39a and 40a, respectively, while blocking lever 21 is rotated in the counterclockwise direction by spring 27. The side edge of blocking lever 21 urges releasing lever 22 to rotate clockwise for engaging bent strip member 21a with notch 21b. As a result, lock lever 26 is rotated in the clockwise direction by spring 29, with claw 26a sliding along the outer periphery of cam plate 35 for engagement with notch 35a upon completion of one revolution of cam plate 35.

Figure 5:
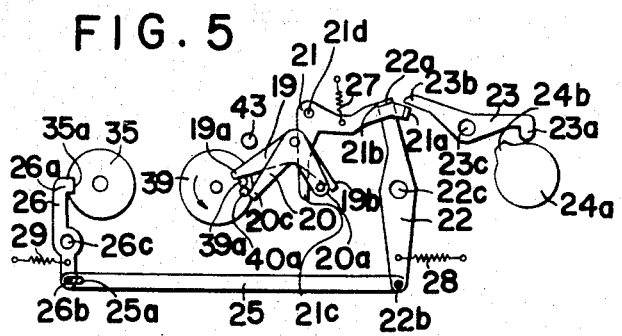
FIG. 5 is a partial plan view showing the shutter mechanism of FIG. 4 in a released position when the voltage of the battery is lower than a predetermined level.

If the voltage of battery E is below a required level when the leading curtain wind-up shaft commences rotation with the releasing operation, electromagnet M fails to retain the armature against the tension of spring 16 after release of the leading curtain as shown in FIG. 5. Therefore, trailing curtain releasing lever 10 is immediately rotated in the clockwise direction, unlocking trailing curtain wind-up shaft 17a' and thus prematurely releasing trailing curtain 17'. The two connecting pin members 39a and 40a are rotated in the counterclockwise direction while in engagement with each other, and connecting pin member 40a together with connecting pin member 39a pushes first operating lever 19 into abutment against stopper 43 before arm 20b is brought into the rotational path of connecting pin member 40a.

Therefore, the clockwise rotation of second operating lever 20 imparted by first operating lever 19 is blocked by connecting pin member 40a and side edge 20c to prevent further rotation of blocking lever 21. The engagement between notch 21b and bent strip member 22a is broken and claw 26a is held in engagement with notch 35a even if the shutter is released, leaving the wind-up mechanism of the camera in a locked condition to signal the operator of the low voltage condition of the battery.

Figure 8:
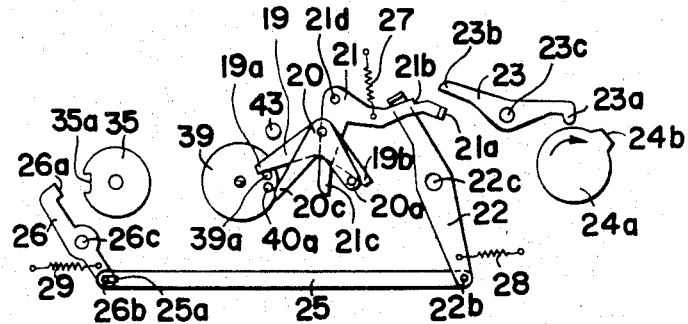
FIG. 8 is a partial plan view showing the shutter mechanism in the position of FIG. 5 when the battery is replaced.

Under these conditions, if lid 24a is rotated to remove and replace the battery in chamber 24, projection 24b is brought into engagement with third operating lever 23, as shown in FIG. 8. Third operating lever 23 is thus rotated in the counterclockwise direction and arm 23b is brought into engagement with bent strip member 21a to impart clockwise rotational movement to blocking lever 21. As a result, notch 21b is disengaged from bent strip member 22a allowing releasing lever 22 to rotate in the counterclockwise direction by spring member 28. Lock lever 26 is rotated in the counterclockwise direction to break the engagement between claw 26a and notch 35a for unlocking the wind-up mechanism and restoring the camera to the normal operative condition.

What is claimed is:

1. A photographic camera of the type having a battery actuated control circuit for controlling exposure and blocking release of a trailing member of a shutter for a time interval subsequent to the release of the leading member of the shutter wherein the blocking apparatus comprises:

means for detecting incorrect movement of said leading and trailing members as an indication that the battery voltage is insufficient for blocking release of said trailing member.

a first means responsive to said means for detecting for blocking operation of the camera when the movement of said leading and trailing members is incorrect; and a second means for restoring the normal operative condition of the camera with replacement of the defective battery.

2. A photographic camera as in claim 1, wherein the camera includes a mechanism for winding film and cocking said leading and trailing member and said first means blocks said winding and cocking mechanism when said means for detecting indicates the battery voltage is insufficient for retaining said trailing curtain, and said second means unblocks said winding and cocking mechanism with replacement of the defective battery.

3. A photographic camera as in claim 2, wherein said first means includes means for locking said winding and cocking mechanism;

said second means includes means for unlocking said means for locking when said means for detecting indicates the battery voltage is sufficient for blocking the release of said trailing member; and further comprising:

means for inhibiting said means for unlocking when said means for detecting indicates the battery has an insufficient voltage for blocking the release of said trailing member; and means for actuating the operation of said means for unlocking with replacement of the defective battery.

4. A photographic camera as defined in claim 3, wherein said mechanism for winding and cocking includes:

a locking member for locking said winding and cocking mechanism subsequent to a winding and shutter cocking operation and further comprising;
a first pin member rotatable with movement of said leading member and a second pin member rotatable with movement of said trailing member, the movement of said leading and trailing members is in response to shutter releasing operation;
said means for detecting including a first operating lever mounted in a position within the path of rotary movement of said first pin member and rotatable together with said first pin member upon engagement therewith and a second operating lever mounted in a position within the path of rotary movement of said second pin member and rotatable together with said second pin member upon engagement therewith; said means for inhibiting includes means for blocking the operation of said second operating lever when said first and second pin members are rotated in association with the leading and trailing members, respectively, and said means for actuating includes a blocking member rotated by the rotary movement of said second operating lever, a third operating lever for rotating said blocking member with replacement of said battery, and a releasing member locked by said blocking member and unlocked by rotary movement of said blocking member whereby said means for unlocking is actuated by said releasing member.

* * * * *